Feb. 28, 1956   J. J. KLEIMACK ET AL   2,736,200
PRESSURE MEASURING APPARATUS
Filed Aug. 23, 1950   2 Sheets-Sheet 1
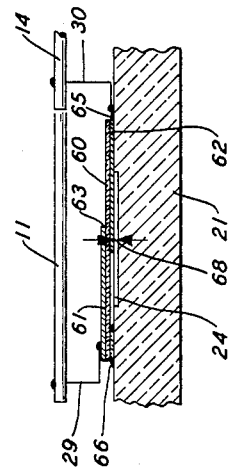
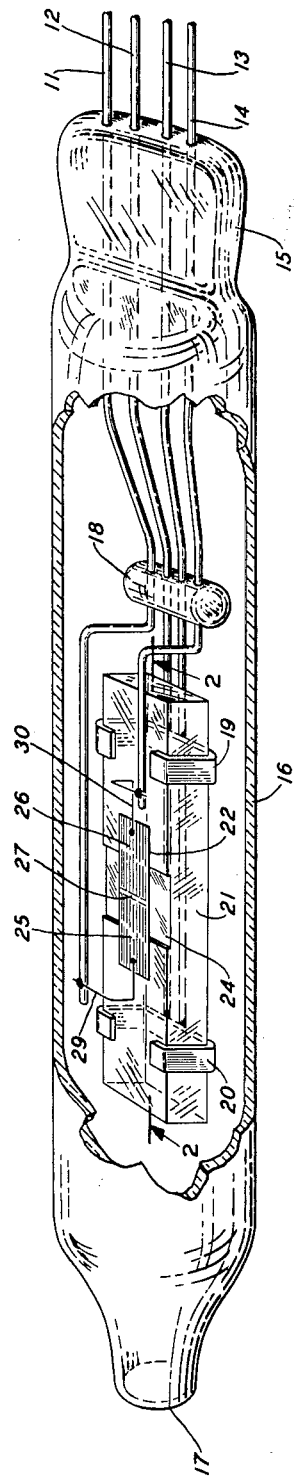
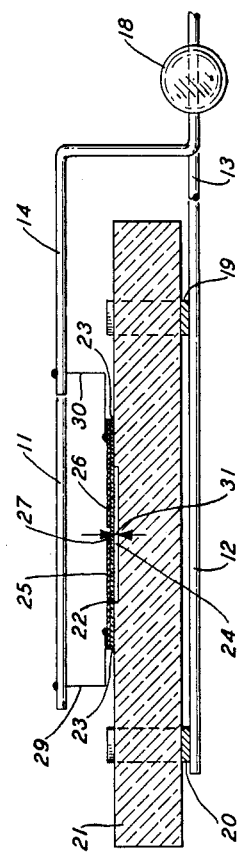
INVENTORS *J. J. KLEIMACK*
*W. R. SITTNER*
BY
*A. J. Guenther*
ATTORNEY

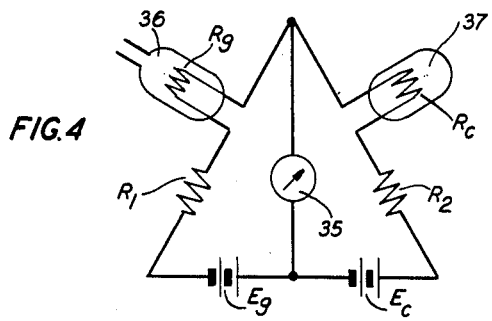
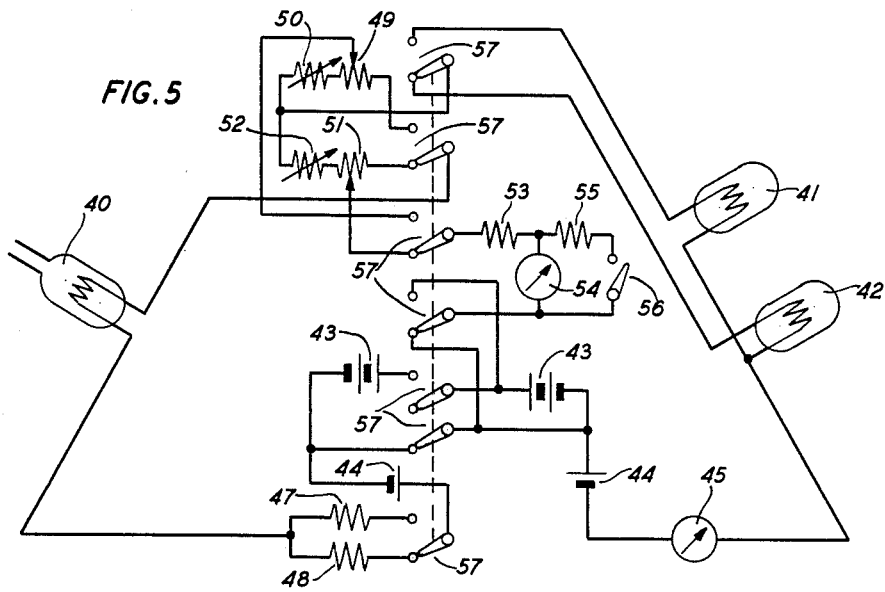
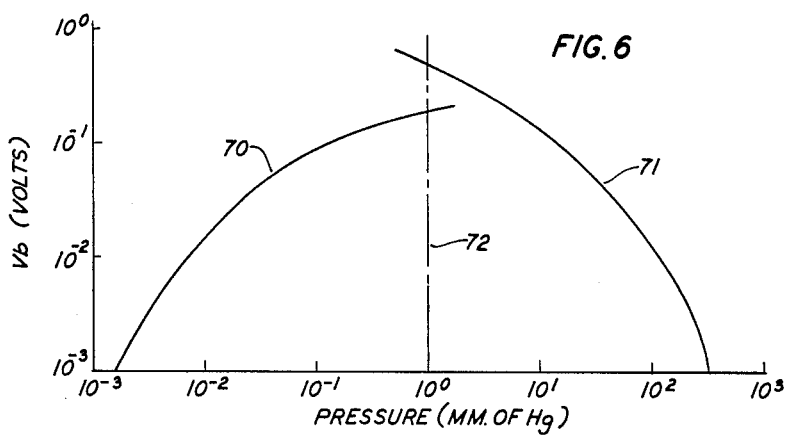
INVENTORS: J. J. KLEIMACK
W. R. SITTNER
BY
ATTORNEY

United States Patent Office 2,736,200
Patented Feb. 28, 1956

2,736,200

PRESSURE MEASURING APPARATUS

Joseph John Kleimack, Scotch Plains, and Weldon R. Sittner, Neshanic Station, N. J., assignors to Bell Telephone Laboratories, Incorporated, New York, N. Y., a corporation of New York Application August 23, 1950, Serial No. 181,088

9 Claims. (Cl. 73—399)

This invention relates to apparatus and methods for measuring pressures and more particularly to heat conductivity manometers.

In the measurement of gas pressures, various phenomena have been utilized in different types of gauges over different pressure ranges. One phenomenon is the change in the heat conductivity of a gas with the change of pressure of the gas. Gauges utilizing this phenomenon are known as heat conductivity manometers. These gauges, which are also referred to as Pirani gauges, operate on the principle that if a filament or resistance material is placed in a bulb having a definite pressure of gas therein the power supplied to the filament must be equal to the sum of all possible power losses including the loss through conduction by the gas and that as the pressure is varied this power loss will vary, which loss can be detected and calibrated against pressure.

Such gauges as have been priorly constructed and employed have been limited in the pressure range for which they can be employed and therefore in their application.

It is one object of this invention to increase the pressure range over which a heat conductivity manometer can be employed.

It is a further object of this invention to increase the sensitivity of heat conductivity manometers.

A still further object of this invention is to facilitate the use of heat conductivity manometers constructed in accordance with this invention and employable over a wide range of pressures.

Still further objects of this invention are to improve the operation and extend the field of use of heat conductivity manometers.

In heat conductivity manometers having a filament or other heat source within a bulb and whose resistance is measured with the dissipation of energy from it, the power input $P_i$ must be equal to all possible power losses; or $$P_i = I^2 R_g \qquad (1)$$

where $R_g$ is the filament resistance and $I$ the current flowing through the resistance. The power losses are $$I^2 R_g = P_R + P_c + P_1 \qquad (2)$$

where $P_R$ is the power lost due to radiation, $P_c$ due to conduction through the gas, and $P_1$ due to conduction back through the leads of the filament. The power lost through the leads may be made negligible compared to the power lost through radiation and through conduction so that only the latter two modes of power loss need be considered.

In Pirani gauges a filament within the bulb is a source of heat, the heat being dissipated to the walls of the bulb which are at the ambient temperature. The power loss due to radiation in such gauges is dependent on the radiant emissivities and the temperatures of this source of heat and of the cold surfaces of the bulb envelope, thus being independent of pressure except as the pressure has second order effects on the temperature of the filament. The equation of the power loss due to radiation may be found at page 313 of Saul Dushman's "Scientific Foundations of Vacuum Technique," John Wiley & Sons, N. Y. (1949), to which book reference is made for a fuller discussion of heat conductivity manometers. Further, it can be shown that the power dissipated by radiation is much less than the power dissipated by conduction through the gases for pressures greater than .1 millimeter of mercury and for reasonable operating values of the temperature of the filament.

Considering $P_R$ to be constant there are still two distinct regimes of thermal conductivity in a gas which depend on the relative values of the mean free path and the distance between the heated and cool surfaces of the gauge and which must be distinguished in considering the limits of the pressure range of a heat conductivity manometer. In order that the change in pressure, and therefore in the number of molecules colliding with the heated surface and directly conducting energy to the cool surface of the gauge, be proportionally indicated in a change in the thermal conductivity of the gas, the mean free path of the gas molecules should be larger than the distance between the heated and cool surfaces. In this low pressure range, there is free molecule conductivity as collisions with other molecules are infrequent compared to collisions with the surfaces. In this range it can be shown that the energy dissipated by conduction is $$P_c = A D_g' p (T_g - T_0) \qquad (3)$$

where A is the area of the heated surface in the gauge, $p$ the gas pressure and $D_g'$ the power conducted by the gas per unit area per unit pressure per unit temperature difference, $(T_g - T_0)$ being the temperature differential between the heated and cool surfaces. $D_g'$ is a property of gas, being $16.6 \times 10^{-3}$ watts per square centimeter per degree centigrade per millimeter of mercury for air.

However, when the mean free path of the gas molecules is smaller than the distance between the heated surfaces the molecules make many collisions with other molecules in traveling from the hot to cold surfaces. For this condition it can be shown that, for a plane geometry configuration, $$P_c = AL \frac{(T_s - T_0)}{d} \qquad (4)$$

where $d$ is the distance between the hot and cool surfaces $(T_g - T_0)/d$ is thus the temperature gradient in that distance, and L is the high pressure conductivity of the gas and is, in the first approximation, independent of the gas pressure. For air, L is $2.42 \times 10^{-4}$ watts per centimeter per degree centigrade.

Thus in order to extend the pressure range of the manometer at its high pressure end it is advantageous to raise this high pressure region in which the energy conducted by the gas is independent of pressure. In accordance with a feature of this invention the pressure range is extended at the high pressure end in one way by positioning the heated surface of the gauge intimately adjacent the cool surface of the gauge. Further, in accordance with this invention both the heated and the cool surfaces of the gauge are incorporated within the bulb or envelope of the gauge, thereby allowing the reduction of the distance between the two and thus removing the high pressure range limitation.

The low pressure limitation of heat conductivity manometers occurs when the amount of energy dissipated by conduction is much less than the energy dissipated by radiation, so that a large change in conductive dissipation results in a small change in the total dissipated energy. In accordance with another feature of this invention heat conductivity manometers are constructed and operated so as to attain maximum sensitivity and low radiation dissipation whereby the lower end of the pressure range may be extended.

It is thus a feature of this invention that the heat source be intimately adjacent the heat sink of the gauge. More specifically it is a feature of this invention that the distance between the heat source and the heat sink be less than .1 millimeter.

It is a further feature of this invention that the heat sink be positioned within the envelope of the gauge.

It is a further feature of this invention that the heat sink be intimately adjacent the heat source within the envelope of the gauge. Further, in accordance with this invention the heat source may be mounted by the heat sink and separated from it a minute distance.

It is a further feature of this invention that the heat source be a small strip of resistor material having conductive material coated over the major portion of the surface or surfaces thereof so that only a small length of the strip is the active heat source, that leads be connected to the conductive material, and that the active length be intimately adjacent the heat sink means within the envelope.

It is a further feature of this invention that the strip of resistor material be mounted flat on the surface of the heat sink means within the envelope of the gauge, a depression being placed in the surface of the gauge adjacent the active length of the strip and determining the distance between the heat source and heat sink means of the manometer.

It is a further feature of this invention that the manometer be operated in a double arm bridge, the manometer being positioned in one arm and atmospheric and vacuum compensator gauges alternative in the other arm, the other circuit parameters being arranged alternatively for high or low pressure operation of the manometer.

It is still a further feature of this invention that the manometer be operated so as to have a temperature differential between the heat source and heat sink means to give maximum sensitivity of reading. More specifically it is a feature of this invention that the temperature differential be equal to the absolute value of the reciprocal of the temperature coefficient of resistance of the material of the heat source.

A complete understanding of this invention and of the various features thereof may be gained from consideration of the following detailed description and the accompanying drawings, in which:

Fig. 1 is a perspective view of a heat conductivity manometer illustrative of one specific embodiment of this invention, a portion of the glass bulb having been broken away to show the internal elements more clearly;

Fig. 2 is an enlarged sectional view along the line 2—2 of Fig. 1, the dimensions being distorted to illustrate details more clearly;

Fig. 3 is a partial, enlarged sectional view of a heat conductivity manometer illustrative of another embodiment of this invention;

Fig. 4 is a schematic diagram of a bridge circuit employable with heat conductivity manometers;

Fig. 5 is a schematic diagram of a preferred bridge circuit employable with heat conductivity manometers in accordance with this invention; and Fig. 6 is a graph of bridge unbalance voltage against pressure for one specific illustrative embodiment of this invention as illustrated in Fig. 3 and employed in the circuit of Fig. 5.

Referring now to the drawing, Fig. 1 shows one illustrative embodiment of a heat conductivity manometer in accordance with certain features of this invention in which four leads 11, 12, 13, and 14 extend through the pressed seal end 15 of a bulb or tube 16, which may advantageously be of glass and which is open at the other end 17 for attachment to a vacuum system. Leads 12 and 13 are attached to clamp members 19 and 20 which embrace a heat sink 21, the leads 12 and 13 thus supporting the heat sink means within the bulb 16. A bead of glass 18 provides mechanical connection between the leads 11, 12, 13, and 14 to aid in supporting the heat sink 21.

The heat sink 21 may advantageously be a glass block shaped as a rectangular parallelepiped, as illustrated in the drawings and having a depression or groove 24 in one surface thereof. However neither this particular material nor this particular shape is critical provided that the heat sink is an independent member within the bulb 16. Thus the heat sink might advantageously be of any material having a fair thermal conductivity, such as Z-cut quartz, or zirconium oxides, among insulating materials, or a metal, such as silver or copper. Depending on the mounting employed for the heat source it may or may not be necessary to coat the metal with a thin layer of an insulating material, such as an oxide coating. In the illustrative embodiment shown in the drawings, the heat source comprises a thin strip 22 of a thermistor material which is directly mounted on the heat sink 21 across the groove 24 as by a glass paste 23 applied between the ends of the strip 22 and the heat sink 21, as best seen in Fig. 2.

The outer side of the strip 22 has thin platinum coatings 25 and 26 at each end leaving only a thin length 27 at the center of the strip 22 which serves as a resistor and heat source for the manometer. Lead 11 is connected to the platinum coating 25 as by a thin platinum wire 29 and lead 14 to coating 26 as by a thin platinum wire 30. Strip 22 extends thus across the depression 24, the active length 27 being adjacent the depression so that a minute distance 31 is defined between the heat source, which is the active length 27 of the strip 22, and the heat sink, which is the block 21.

In one specific illustrative embodiment of this invention the strip 27 is of thermistor material, and specifically of manganese and nickel oxides, .01 mm. thick, 1.0 mm. wide, and approximately 7 mm. long. The platinum coatings 25 and 26 are approximately $10^{-4}$ mm. thick and extend towards each other so that the active length 27 of the heat source is 0.25 mm. The heat sink 21 is approximately 2 cm. long and the depression 24 2 mm. wide and .01 mm. deep, so that the distance 31 between the heat source and the heat sink is .01 mm. In the particular embodiment of the invention illustrated in Fig. 1 we have been able to reduce the distance 31 to about .008 mm. thereby increasing the range of heat conductivity manometers by maintaining the distance less than the mean free path of the gas at the higher pressures. The leads 11, 12, 13, and 14 and the supports 20 and 21 may advantageously be of a copper nickel iron alloy known as "cunife."

While the heat source has been shown as a small active length of a thermistor strip this invention is not to be considered as limited thereto as other resistance materials, such as pure metals or alloys, among others, may also be advantageously employed provided they are positioned intimately adjacent the heat sink. Similarly the mounting for the heat source and the shape of the heat sink adjacent the heat source are not critical. Thus the heat source may be itself positioned in a groove in a heat sink, the groove and heat sink being slightly concave. However, we have found that employing a flat surfaced heat sink and directly mounting the heat source material on the heat sink is most advantageous in reducing the distance 31 and thereby increasing the high pressure range of the gauge. Further we have found it advantageous to coat the heat source material so that there is only a short active length.

While advantageously the electrode coating may be on one surface of the heat source and the other surface secured to the heat sink means as by a glass paste, the electrode material may be placed on opposite surfaces of the heat source means so as to form a "sandwich" type resistance, the electrode coatings overlapping for only a short distance which defines the active length, as in the embodiment illustrated in Fig. 3. Referring now to that figure, a strip 60 of thermistor material has a thin platinum coating 61 on its outer side and a similar coating 62 on its inner side adjacent the heat sink 21, the coatings being on opposite ends of the strip 60 but overlapping in the center so that there is an active length 63 between the two coatings and through which the current flows. The heat source, which is the strip 60 of thermistor material, is mounted on the heat sink 21, the coating 62 being secured to the heat sink 21 as by a silver paste 65 and the strip itself being secured to the heat sink at its other end by a glass paste 66. Lead wire 11 is connected to the platinum coating 61 by the thin platinum wire 29, and lead wire 14 is connected to the platinum coating 62 by the thin platinum wire 30 which is secured to the silver paste 65.

In one specific embodiment of this invention constructed in accordance with Fig. 3, the heat source was a strip of a thermistor material, and more specifically of manganese and nickel oxides, .01 millimeter thick, 0.5 millimeter wide, and about 7 millimeters long. The two platinum coatings 61 and 62 overlapped in the center by approximately 0.3 millimeter, thus defining the width of the short active length 63. The distance 68 between the heat source, defined by the active length 63, and the heat sink was approximately .03 millimeter.

Referring now to Fig. 4 there is shown one bridge circuit employable with this manometer. In this circuit two parallel arms are placed across a voltmeter 35, each arm including a source of voltage $E_g$ or $E_c$, a stabilizing resistance $R_1$ or $R_2$, and a gauge 36 or 37, the gauge 36 being a manometer associated with a vacuum system and having an equivalent resistance $R_g$ and the gauge 37 being a closed compensator having an equivalent resistance $R_c$. We have found that by employing this bridge circuit with manometers in accordance with our invention we have been able to double the sensitivity of the readings over those obtainable with the usual four arm Wheatstone bridge.

In order to reduce the lower limit of the gauge and thereby extend the range of pressures over which the manometer will accurately indicate the pressure, it is desirable to increase the sensitivity of the indications of pressure changes, as explained above. In accordance with our invention, the maximum sensitivity is attained when the manometer is operated so as to have a temperature differential between the heat source and the heat sink means approximately equal to the absolute value of the reciprocal of the temperature coefficient of the heat source means.

Consider now the circuit shown in Fig. 4. If, with a given pressure of gas in the gauge, the bridge is balanced then the voltage $V_b$ across the voltmeter 35 is zero. If the gas pressure is changed, a change in temperature of the active elements of the gauge and compensator changes their resistances by $\Delta R_g$ and $\Delta R_c$ respectively. It can be shown that the voltage $V_b$ is $$V_b = V_g \frac{R_c}{\Sigma R} \left[ \frac{\Delta R_g}{R_g} - \frac{\Delta R_c}{R_c} \right] \quad (5)$$

where $$\Sigma R = R_c + R_g + R_1 + R_2 \quad (6)$$

and $$V_g = I(R_g + R_1) \quad (7)$$

$I$ being the current through the manometer and compensator.

Considering first the case in which the heat source 27 is of metal or an alloy which has a straight line variation of resistance with temperature, i. e., $$R_g = R_0[1 + \alpha(T_g - T_0)] \quad (8)$$

where $\alpha$ is the thermal coefficient of resistance for the material of the gauge, equation (7) can be rewritten as $$V_b = V_g \frac{R_c}{\Sigma R} [\alpha \Delta T_g - \alpha \Delta T_c] \quad (9)$$

It can also be shown that for the manometer the relationship between change in the temperatures of the heat sources of the gauge and the compensator for a given change in pressure in the gauge is $$\Delta T_g - \Delta T_c = \frac{\Delta D_g (T_g - T_0)}{D_g [1 - \alpha (T_g - T_0)]} \quad (10)$$

where $\Delta T_g$ and $\Delta T_c$ are the incremental changes in the temperature of the gauges and the compensator respectively, $T_0$ is the temperature of the heat sink 21, and $D_g$ is the dissipation constant related to either $D'_g$ of Equation 3 or L of Equation 4 as the case may be. Because of the intimate spacing of the heat source and the heat sink means, which are both positioned within the bulb of the gauge, free molecule conductivity exists over a wide range of pressure. This is the condition for which Equation 3 holds.

$V_b$ in Equation 9 may be considered to be $\Delta V_b$, as the term represents the very small voltage due to circuit unbalance. If we combine Equations 9 and 10 and divide through by $$\frac{\Delta D_g}{D_g}$$

the following equation results:

$$\frac{\Delta V_b / V_g}{\Delta D_g / D_g} = \frac{R_c}{\Sigma R} \alpha \left[ \frac{T_g - T_c}{1 - \alpha(T_g - T_0)} \right] \quad (10a)$$

In order to simplify the left-hand side of this equation, it can be noted that $$\frac{\Delta D_g}{D_g}$$

is the derivative of the logarithm of $D_g$, the dissipation constant which in this analysis is a function of pressure, as given by Equation 3. Equation 10a is therefore of the form $$1/V_g \Delta V_b = \frac{\Delta D_g}{D_g} \text{[constant]} \quad (10b)$$

which in the limit is equal to $$\frac{1}{V_g} dV_b = d\ln D_g \text{ [constant]} \quad (10c)$$

$V_g$ in this analysis is substantially constant, being given by Equation 7, and may therefore be placed either inside or outside the differential.

Therefore by combining Equations 9 and 10 and omitting the subscripts as the gauge and compensator are identical $$-\frac{d\left(\frac{V_b}{V_g}\right)}{d\ln D_g} = -\frac{d\left(\frac{V_b}{V_g}\right)}{d\ln p} = S = \frac{R_c \alpha(T_g - T_0)}{\Sigma R[1 - \alpha(T_g - T_0)]} \quad (11)$$

where $S$ is the sensitivity or the change in the ratio of $V_b$ to $V_g$, $V_g$ being substantially constant, for a given percentage change in pressure in the gauge. From this equation it can be shown that the maximum sensitivity is obtained when $$T_g - T_0 = \left| \frac{1}{\alpha} \right| \quad (12)$$

It is to be noted that this result is entirely independent of the bridge or measuring circuit employed as the operating condition for maximum sensitivity is expressed only in terms of the element itself and not in terms of any circuit parameters.

When the heat source is a semiconductor or other element having a logarithmic resistance-temperature characteristic, as $$R_g = R_0 e^{\alpha(T_g - T_0)} \quad (13)$$

it can be shown that the sensitivity is determined in accordance with Equation 11 and that the maximum sensitivity will occur when the temperature differential between the heat source and the heat sink is equal to the absolute value of the reciprocal of the temperature coefficient of resistance, as stated by Equation 12. Because of the difference in sign of the temperature coefficients of resistance for semiconductors and for metals, the temperature differential for maximum sensitivity is an absolute value.

By thus operating manometers in accordance with this invention with a temperature differential approximately equal to the absolute value of the reciprocal of the temperature coefficient of resistance we have been able to increase the sensitivity and range of the manometer. In the operation of the manometer over this wide range, the temperature change is very slight so that the gauge always operates at approximately this temperature. This change in temperature causes a slightly variation in the power input which could be avoided if desired by a more complicated constant power circuit, but we have found the deviation too slight to correct for and also that it does not have bearing on the accuracy of the gauge.

Thus in the embodiments illustrated in Figs. 1 and 3 wherein the heat sources 27 and 60 are of thermistor material having a temperature coefficient of resistance of approximately 4% per degree centigrade, the temperature differential between the heat source and the heat sink may advantageously be substantially 25° C. When the heat source 27 is of a resistance material such as copper having a temperature coefficient of resistance of approximately .4% per degree centigrade, the temperature differential may advantageously be approximately 250° C.

Referring now to Fig. 5 there is shown one circuit which has been employed with manometers of the types disclosed in Figs. 1 and 3, constructed and operated in accordance with this invention. As seen there the gauge 40 is placed in one arm of the bridge and two alternative compensator gauges 41 and 42 in the other arm, compensator 41 being an atmospheric compensator for the upper range of pressure and compensator 42 being a vacuum compensator for the lower range of pressure. Voltage supply means 43 and 44 are in each arm, an ammeter 45 being also placed in the compensator arm. Stabilizing and balancing resistances 47, 48, 49, 50, 51 and 52 are positioned in the two arms, a resistance 53 being in series with the voltmeter 54 across the two arms. A shunt resistance 55 may be placed across the voltmeter by the switch 56. As shown in the drawing the alternative compensators 41 and 42 together with the various alternative voltage supplies 43 and 44 and resistances are connected in the circuit by switches 57, all of which may advantageously be mechanically secured together so that the change over from one range of the manometer constructed and operated in accordance with this invention to another, which requires a change from one compensator to the other, may be accomplished by a single operation.

In one illustrative circuit as shown in Fig. 5 and in which the heat conductivity manometer 40, the atmospheric compensator 41, and the vacuum compensator 42 were constructed and operated in accordance with this invention employing the "sandwich" type thermistor of Fig. 3, the resistance $R_g = R_c$ for the identically constructed manometer and compensators was 1500 ohms and of the other resistances of the circuit were as follows:

| Resistance: | Ohms |
|---|---|
| 47 | 300 |
| 48 | 1100 |
| 49 | 1000 |
| 50 | 0–600 |
| 51 | 1000 |
| 52 | 0–200 |
| 53 | 2000 |
| 55 | (Depends on meter used) |

The voltages supply 43 was 4.5 volts and voltage supply 44 1.5 volts, the two being placed in series when the atmospheric compensator is employed and voltage supply 44 being in the circuit alone when the vacuum compensator is employed.

An illustrative graph of pressure in the manometer as against voltage $V_b$, as determined by the voltmeter 54 in the circuit of Fig. 5 for one specific embodiment of this invention, is shown in Fig. 6. While the values are to be understood as merely illustrative of those attainable by the employment of this invention, it is apparent that a very wide pressure range is covered, which range is centered around a pressure of one millimeter, indicated on the graph by line 72. By employing the circuit of Fig. 5 with the vacuum compensator the relationship between pressure and voltage indication is given by the curve 70 and by employing the atmospheric compensator the relationship is given by the curve 71. Thus a heat conductivity manometer constructed and operated in accordance with this invention may be advantageously employed to give accurate readings for pressures of the order of 500 millimeters of mercury at the upper end of the manometer range and below $10^{-3}$ millimeters of mercury at the lower end of the pressure range, thereby giving a range of pressures of the order of a million to one.

It is to be understood that the above described arrangements are illustrative of the application of the principles of the invention. Numerous other arrangements may be devised by those skilled in the art without departing from the spirit and scope of the invention.

What is claimed is:

1. A heat conductivity manometer comprising an envelope, a block of material supported within said envelope and defining a heat sink, said block having a flat surface and a groove in said surface, a strip of resistance material mounted on said surface and across said groove, conductive surfaces on said resistance material and defining a small active length heat source formed by the portion of said resistance material intermediate said conductive surfaces, said active length being adjacent said block at said groove, said groove thereby defining a minute distance between said heat sink and said heat source, and lead wires electrically connected to said conductive surfaces and extending through said envelope.

2. A heat conductivity manometer comprising an envelope, a block of glass supported within said envelope defining a heat sink, said block having a flat surface and a groove in said surface, a strip of thermistor material mounted on said surface across said groove, a conductive coating on each end of said thermistor material away from said block, said conductive coatings extending over almost the whole length of said strip and defining a narrow active length heat source formed by an uncoated portion of said strip at the middle of said strip, said active length being adjacent said block at said groove, said groove thereby defining a minute distance between said heat sink and said heat source, and lead wires electrically connected to said conductive coatings and extending through said envelope.

3. A heat conductivity manometer comprising an envelope, a block of glass supported within said envelope defining a heat sink, said block having a flat surface and a groove in said surface, a strip of thermistor material mounted on said surface across said groove, a conductive coating on one side of said thermistor material between said block and said thermistor material, a conductive coating on the other side of said thermistor material away from said block, said coatings being at opposite ends of said thermistor material and overlapping a short distance at approximately the center of said thermistor material, said overlap defining a short active length heat source adjacent said block at said groove, said groove thereby defining a minute distance between said heat sink and said heat source, and lead wires electrically connected to said conductive coatings and extending through said envelope.

4. A heat conductivity manometer comprising an envelope, a block of material within said envelope defining a heat sink, said block having a surface having a groove therein, a strip of resistance material supported by said block at said surface and across said groove, conductive surfaces on said resistance material over said groove and defining a small active length heat source formed by the portion of said resistance material intermediate said conductive surfaces, lead wire means electrically connected to said conductive surfaces and extending through said envelope, and means for attaching said envelope to a vacuum system.

5. A heat conductivity manometer in accordance with claim 4 wherein the depth of said groove defining the distance between said heat sink and said heat source is less than .1 millimeter.

6. A heat conductivity manometer comprising an envelope, a block of material within said envelope and defining a heat sink, a strip of resistance material supported by said block intimately adjacent one surface thereof and defining a heat source, means associated with said block defining a minute spacing between said heat source and said block, lead wire means electrically connected to said strip and extending through said envelope and means for attaching said envelope to a vacuum system.

7. A heat conductivity manometer in accordance with claim 6 wherein said center of said strip is effectively separated from the surface of said block by a distance of less than .1 millimeter.

8. A heat conductivity manometer comprising an envelope, a block of material supported within said envelope defining a heat sink, a strip of resistance material supported by said block in said envelope, conductive surfaces on said resistance material and defining a small active length heat source formed by the portion of said resistance material intermediate said conductive surfaces, means associated with said block defining a minute spacing between said active length and said block, lead wire means electrically connected to said conductive surfaces and extending through said envelope, and means for attaching said envelope to a vacuum system.

9. A heat conductivity manometer comprising an envelope, a block of material within said envelope defining a heat sink, said block having a surface having a groove therein, a strip of resistance material supported by said block at said surface and across said groove, conductive surfaces on said resistance material and defining a small active length heat source formed by the portion of said resistance material intermediate said conductive surfaces, said groove defining the distance between said heat sink and said heat source, means for maintaining a temperature differential between said block and said small active length heat source substantially equal to the absolute value of the reciprocal of the temperature coefficient of resistance of said resistance material, said means comprising means for passing electric current through said strip of resistance material, and means for attaching said envelope to a vacuum system.

References Cited in the file of this patent

UNITED STATES PATENTS

| 2,149,441 | Jacobson | Mar. 7, 1939 |
| 2,204,966 | Morgan | June 18, 1940 |
| 2,241,555 | Krogh et al. | May 13, 1941 |
| 2,414,792 | Becker | Jan. 28, 1947 |
| 2,460,873 | Clewell | Feb. 8, 1949 |

FOREIGN PATENTS

| 670,541 | France | Aug. 19, 1925 |
| 498,159 | Great Britain | Jan. 4, 1939 |
| 574,798 | Great Britain | Jan. 21, 1946 |

OTHER REFERENCES

Tanner Journal of Physical Chemistry, vol. 34, 1930, pp. 1113, 1114, 1115.

Ellett et al.: Physical Review, Second Series, vol. 37, May 1, 1931, pp. 1102–1111.

Murman: pp. 14–20, Zeitschrift fur Physik, vol 86, 1933.

Rittner: Review of Scientific Instruments, vol. 17, #3, Mar. 1946, pp. 113 and 114.

Von Ubisch: "An Investigation on Hot-Wire Vacuum Gauges," "Arkiv for Mathematik, Astronomi och Fysik" (Uppsala), vol. 34A (1947–48), No. 14, 33 pp. numbered 1–33, pp. 21–31.

Dushman: "Vacuum Technique," p. 328, N. Y., 1949, John Wiley & Sons, Inc.